US011007922B1

(12) United States Patent
    Couch

(10) Patent No.: US 11,007,922 B1
(45) Date of Patent: May 18, 2021

(54) LOAD SECURING DEVICE

(71) Applicant: Steven D. Couch, Aladdin, WY (US)

(72) Inventor: Steven D. Couch, Aladdin, WY (US)

( * ) Notice: Subject to any disclaimer, the term of this patent is extended or adjusted under 35 U.S.C. 154(b) by 0 days.

(21) Appl. No.: 17/031,413

(22) Filed: Sep. 24, 2020

(51) Int. Cl.
    *B60P 7/08* (2006.01)
    *B60P 7/135* (2006.01)

(52) U.S. Cl.
    CPC .................................. *B60P 7/135* (2013.01)

(58) Field of Classification Search
    CPC  B60P 7/135; B60P 7/0892; B60P 7/14; B60P 7/15
    USPC .......... 410/94, 121, 122, 123, 127, 128, 151
    See application file for complete search history.

(56) References Cited

U.S. PATENT DOCUMENTS

| | | | |
|---|---|---|---|
| 923,463 A * | 6/1909 | Taylor | |
| 3,049,328 A | 8/1962 | Bishop | |
| 4,781,499 A | 11/1988 | Wisecarver | |
| 5,028,185 A | 7/1991 | Shannon | |
| 5,109,985 A | 5/1992 | Rose | |
| 5,378,095 A | 1/1995 | Shultz | |
| 5,443,342 A | 8/1995 | Huang | |
| 5,472,301 A | 12/1995 | Wallen | |
| 5,769,580 A | 6/1998 | Purvis | |
| 5,833,414 A | 11/1998 | Feldman | |
| 5,890,856 A | 4/1999 | Huang | |
| 5,947,666 A | 9/1999 | Huang | |
| 6,042,312 A | 3/2000 | Durham, II | |
| 6,210,090 B1 | 4/2001 | Wyse | |
| 6,247,882 B1 | 6/2001 | Huang | |
| 6,368,037 B1 | 4/2002 | Oliviero | |
| 6,598,756 B1 | 7/2003 | Rosenfeldt | |
| 6,733,220 B2 | 5/2004 | Brown | |
| 6,742,975 B2 | 6/2004 | Trine | |
| 6,755,600 B2 | 6/2004 | Scott | |
| 7,334,973 B2 | 2/2008 | Scott | |
| 7,735,429 B2 | 6/2010 | Meissen | |
| 8,162,576 B1 | 4/2012 | Chou | |
| 8,202,029 B2 * | 6/2012 | Chou ........................ | B60P 7/15 410/143 |
| 8,608,416 B2 | 12/2013 | Xiao | |

(Continued)

OTHER PUBLICATIONS https://www.uscargocontrol.com/Round-Tube-Steel-Cargo-Bar-w-2-25-x-3-Pads-Adj-39-71; US Cargo Control Ratcheting Cargo Bar Webpage; Received Aug. 13, 2019.

(Continued)

*Primary Examiner* — Stephen T Gordon
(74) *Attorney, Agent, or Firm* — Neustel Law Offices

(57) ABSTRACT

A load securing device for securing a load such as a pallet within a container such as a cargo trailer so as to prevent the load from side-to-side shifting or jostling. The load securing device includes an inner support telescopically connected to an outer support. The inner support includes a first brace and the outer support includes a second brace. The inner and outer supports each include a ratchet for drawing the supports towards or away from each other so as to lengthen or shorten the effective length of the load securing device. A handle is connected between the first and second ratchets so that the handle may adjust the ratchets. A locking device is included for selectively locking the handle in place to prevent further adjustment of the supports. The braces may be secured between a load and a container to secure the load within the container.

17 Claims, 11 Drawing Sheets

(56) References Cited

U.S. PATENT DOCUMENTS

| 9,487,293 | B2 | 11/2016 | Noe | |
|---|---|---|---|---|
| 10,040,601 | B2 | 8/2018 | Noe | |
| 2003/0152437 | A1* | 8/2003 | Moore | B60P 7/15 |
| | | | | 410/121 |
| 2009/0057272 | A1 | 3/2009 | Modgil | |
| 2009/0202315 | A1* | 8/2009 | Keramidis | B60P 7/15 |
| | | | | 410/121 |
| 2016/0243976 | A1 | 8/2016 | Cote | |

OTHER PUBLICATIONS http://polyurethane.americanchemistry.com/resources-and-document-library/guidelines-for-freight-securement.pdf; American Chemistry Council Guidelines for Freight Securement Article, Issue AX173; Telescoping Load Bars—p. 19; Aug. 2012.
https://www.uline.com/product/detail/h-1413/dock-equipment/steel-load-bar-87-119; Uline Steel Ratchet Load Bar Webpage; Received Aug. 13, 2019.
https://www.rv4x4.net.au/ratcheting-cargo-bar-40-70; RV 4×4 Ratcheting Cargo Bar Webpage; Received Aug. 13, 2019.
https://www.homedepot.com/p/CargoLoc-Light-Duty-Ratcheting-Cargo-Bar-82342/309994567; CargoLoc Light-Duty Ratcheting Cargo Bar from Home Depot Webpage; Received Aug. 13, 2019.
https://www.globalindustrial.com/p/material-handling/dock-truck/cargo-restraint-bars/folding-steel-cargo-bar-load-stabilizer; Global Industrial Folding Steel Cargo Control Bar & Load Stabilizer Webpage; Received Aug. 13, 2019.

\* cited by examiner

US 11,007,922 B1

LOAD SECURING DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a load securing device for securing a load such as a pallet within a container such as a cargo trailer so as to prevent the load from side-to-side shifting or jostling.

Related Art

Any discussion of the related art throughout the specification should in no way be considered as an admission that such related art is widely known or forms part of common general knowledge in the field.

Since the inception of transport containers, whether transported by wagon, boat, vehicle, aircraft, or the like, it has been desirable to secure a load within the transport container such that the load does not move around, such as side-to-side shifting. If not properly secured, the movements of the transporting vehicle may cause the load to be jostled about, possibly impacting either the wall of the container within which the load is positioned, or impacting other loads. Such impacts can cause serious damage to the load being transported.

In the past, various devices have been used to secure such loads within a transport container. A common approach is to nail wooden boards to the ground surface adjacent to the load, with the wooden boards being secured between the load and the respective walls of the container. However, such wooden boards are fixed and thus cannot be easily adjusted in length to accommodate for different-sized loads.

Further, where other types of braces which may not be secured to the ground surface are used, such braces are typically difficult to adjust or do not efficiently secure the load so as to prevent any and all movement in any direction during transport in the container. Other previous braces may require that the brace be secured to the center-of-mass of the side of the load, thus requiring such braces to be elevated off the ground surface which can restrict movement of personnel within the container.

SUMMARY

An example embodiment is directed to a load securing device. The load securing device includes an inner support telescopically connected to an outer support. The inner support includes a first brace and the outer support includes a second brace. The inner and outer supports each include a ratchet for drawing the supports towards or away from each other so as to lengthen or shorten the effective length of the load securing device. A handle is connected between the first and second ratchets so that the handle may adjust the ratchets. A locking device is included for selectively locking the handle in place to prevent further adjustment of the supports. The braces may be secured between a load and a container to secure the load within the container.

There has thus been outlined, rather broadly, some of the embodiments of the load securing device in order that the detailed description thereof may be better understood, and in order that the present contribution to the art may be better appreciated. There are additional embodiments of the load securing device that will be described hereinafter and that will form the subject matter of the claims appended hereto. In this respect, before explaining at least one embodiment of the load securing device in detail, it is to be understood that the load securing device is not limited in its application to the details of construction or to the arrangements of the components set forth in the following description or illustrated in the drawings. The load securing device is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
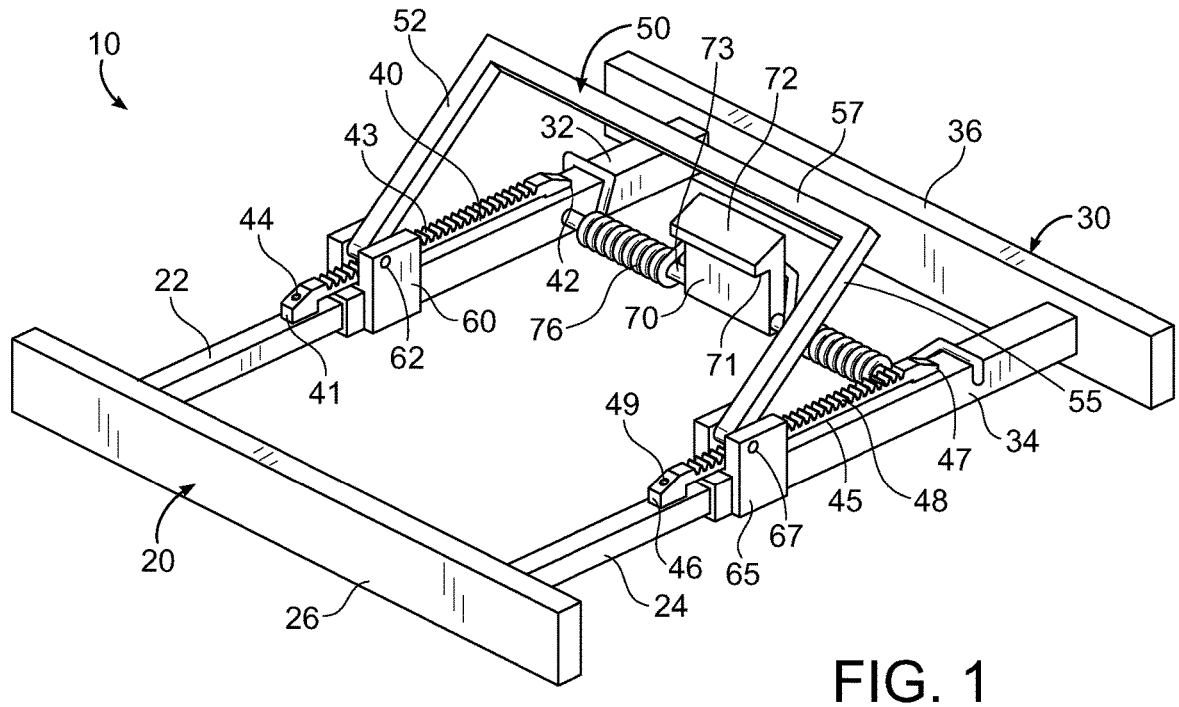
FIG. 1 is a perspective view of a load securing device with the handle disengaged in accordance with an example embodiment.

A. Overview.

An example load securing device 10 generally comprises an inner support 20 comprising a first brace 26; an outer support 30 comprising a second brace 36, wherein the inner support 20 is movably connected to the outer support 30 such that the inner support 20 and outer support 30 may be moved towards or away from each other; a first adjustment member 40 connected between the inner support 20 and the outer support 30, the first adjustment member 40 being fixedly connected to the inner support 20 and movably positioned upon the outer support 30; a first ratchet 60 connected to the outer support 30 above the first adjustment member 40; and a handle 50 pivotally connected to the first ratchet 60 such that pivoting the handle 50 adjusts the first ratchet 60, wherein the first ratchet 60 is operable to push the inner support 20 away from the outer support 30.

The first adjustment member 40 may comprise an elongated member having a plurality of first teeth 43. The outer support 30 may be comprised of a first outer member 32 and a second outer member 34, wherein the first outer member 32 is parallel with respect to the second outer member 34. The first inner member 22 is telescopically connected to the first outer member 32 and the second inner member 24 is telescopically connected to the second outer member 34. A locking member 70 may be connected to the outer support 30, wherein the locking member 70 comprises a flange 71. The handle 50 is adapted to releasably engage within the flange 71 of the locking member 70 so as to releasable lock the outer support 30 and the inner support 20 in a position.

Also disclosed is a method of securing a load 14 using the load securing device 10, which includes the steps of positioning a load 14 within a container 11, the container 11 comprising a container wall 12a, 12b; positioning the load securing device 10 between the load 14 and the container wall 12a, 12b; and pivoting the handle 50 in a first direction to extend a length of the load securing device 10 such that the first brace 26 engages against the load 14 and the second brace 36 engages against the container 11. The load securing device 10 may include a locking member 70 and the method may further comprise the step of engaging the handle 50 within the locking member 70 so as to prevent adjustment of the load securing device 10.

Another exemplary embodiment of a load securing device 10 may comprise an inner support 20 comprising a first inner member 22, a second inner member 24, and a first brace 26 connected between the first inner member 22 and the second inner member 24; an outer support 30 comprising a first outer member 32, a second outer member 34, and a second brace 36 connected between the first outer member 32 and the second outer member 34, wherein the inner support 20 is movably connected to the outer support 30 such that the inner support 20 and outer support 30 may be moved towards or away from each other; a first adjustment member 40 connected between the inner support 20 and the outer support 30, the first adjustment member 40 being fixedly connected to the first inner member 22 and movably positioned upon the first outer member 32; a first ratchet 40 connected to the first outer member 32 above the first adjustment member 40; and a handle 50 pivotally connected to the first ratchet 60 such that pivoting the handle 50 adjusts the first ratchet 60, wherein the first ratchet 60 is operable to push the first inner member 22 away from and partially out of the first outer member 32.

The first inner member 22 may be telescopically connected to the first outer member 24. A second adjustment member 45 may be connected between the inner support 20 and the outer support 30, the second adjustment member 45 being fixedly connected to the second inner member 24 and movably positioned upon the second outer member 34. A second ratchet 65 may be connected to the second outer member 34 above the second adjustment member 45. The handle 50 may be pivotally connected to the second ratchet 65 such that pivoting the handle 50 adjusts the second ratchet 65, wherein the second ratchet 65 is operable to push the second inner member 24 out of the second outer member 34. The first inner member 22 may be parallel to the second inner member 24 and the first outer member 32 may be parallel to the second outer member 34.

A locking member 70 may be connected to the outer support 30, wherein the locking member 70 comprises a flange 71. The handle 50 is adapted to releasably engage with the flange 71 of the locking member 70 so as to removably lock the outer support 30 and the inner support 20 in a position. The locking member 70 may be connected to a lock support 73, wherein the lock support 70 is connected between the first outer member 32 and the second outer member 34. A spring 76 may be connected between the locking member 70 and the lock support 73 so as to bias the locking member 70 towards an upright position.

Another exemplary embodiment of a load securing device 10 may comprise an inner support 20 comprising a first inner member 22, a second inner member 24, and a first brace 26 connected between the first inner member 22 and the second inner member 24; an outer support 30 comprising a first outer member 32, a second outer member 34, and a second brace 36 connected between the first outer member 32 and the second outer member 34, wherein the inner support 20 is movably connected to the outer support 30 such that the inner support 20 and outer support 30 may be moved towards or away from each other; a first adjustment member 40 connected between the inner support 20 and the outer support 30, the first adjustment member 40 being fixedly connected to the first inner member 22 and movably positioned upon the first outer member 32; a second adjustment member 45 connected between the inner support 20 and the outer support 30, the second adjustment member 45 being fixedly connected to the second inner member 24 and movably positioned upon the second outer member 34; a first ratchet 60 connected to the first outer member 32 above the first adjustment member 40; a second ratchet 65 connected to the second outer member 34 above the second adjustment member 45; and a handle 50 pivotally connected to the first ratchet 60 and the second ratchet 65 such that pivoting the handle 50 adjusts the first ratchet 60 and the second ratchet 65, wherein the first ratchet 60 is operable to push the first inner member 22 out of the first outer member 32, wherein the second ratchet 65 is operable to push the second inner member 24 out of the second outer member 34.

B. Supports.

As shown throughout the figures, the load securing device 10 generally includes a pair of supports 20, 30 which each include a brace 26, 36 adapted to secure a load 14 within a container 11. In the embodiment best shown in FIGS. 1-8, the load securing device 10 comprises an inner support 20 and an outer support 30 which are interconnected together. In such an embodiment, the inner support 20 and outer support 30 may be movable with respect to each other such that the effective length of the load securing device 10 may be adjustable to suit different containers 11 or loads 14. For example, a larger load 14 in a smaller container 11 will require a shorter length of the load securing device 10 than a smaller load 14 in a larger container 11.

The figures illustrate an embodiment in which a telescopic configuration is utilized, with the inner support 20 being telescopically adjustable with respect to the outer support 30. In such an embodiment, the inner support 20 is movably positioned within the outer support 30 such that the inner support 20 may be telescopically adjustable with respect to the outer support 30. Thus, the inner and outer supports 20, 30 may be adjusted towards each other by, for example, the inner support 20 being pushed towards from the outer support 30. Conversely, the inner and outer supports 20, 30 may be adjusted away from each other by, for example, the inner support 20 being pulled away from the outer support 30.

Adjusting the inner and outer supports 20, 30 towards each other will decrease (shorten) the effective length of the load securing device 10 and adjusting the inner and outer supports 20, 30 away from each other will increase (lengthen) the effective length of the load securing device 10. In this manner, different loads 14 and containers 11 may be supported with the same load securing device 10.

The shape, size, and configuration of the inner and outer supports 20, 30 may vary in different embodiments to suit different containers 11 and loads 14. Further, the range of the effective length of the load securing device 10, which is itself determined by the size and range of movement of the inner and outer supports 20, 30, may vary in different embodiments for the same purpose. Thus, the exemplary embodiments shown in the figures should not be construed as limiting in scope, particularly with respect to the size and effective range of movement of the inner and outer supports 20, 30 shown therein, which are merely for exemplary purposes.

In the exemplary embodiment shown in FIGS. 1-8, the inner and outer supports 20, 30 are illustrated as comprising a substantially rectangular shape, with the length of the resulting rectangle being adjustable by adjusting the inner and outer supports 20, 30. Such a configuration provides support on a path along the width of the load 14 being supported, rather than only providing support at a single specific point as occurs when a rod or pole, for example, is instead used to support the load 14 as has been attempted previously.

As best shown in FIGS. 1-8, the inner support 20 may comprise a first inner member 22 and a second inner member 24, with the first inner member 22 and the second inner member 24 being parallel with respect to each other. Each of the first and second inner members 22, 24 may comprise various elongated members, such as but not limited to bars, rods, posts, poles, and the like. Although the figures illustrate that the first and second inner members 22, 24 each comprise a square-shaped cross-section, it should be appreciated that various other cross-sections could be utilized, such as but not limited to a circular cross-section or a triangular cross-section.

The first and second inner members 22, 24 are generally adapted to be telescopically adjustable within a pair of corresponding first and second outer members 32, 34 on the outer support 30. In this manner, the inner support 20 may be inserted into the outer support 30 and telescopically adjusted therein. In the exemplary embodiment shown in the figures, the first and second inner members 22, 24 each comprise elongated members which are solid and which are configured to slide into or out of the corresponding hollow outer members 32, 34. Thus, the size of the inner members 22, 24 will generally be just slightly smaller than the opening of the corresponding outer members 32, 34 such that the inner members 22, 24 may fit within the outer members 32, 34 as shown in the figures.

The first and second inner members 22, 24 are each shown as being connected to a first brace 26. The manner in which the first and second inner members 22, 24 are connected to the first brace 26 may vary in different embodiments. For example, the first and second inner members 22, 24 may be welded to the first brace 26, or otherwise connected using fasteners, brackets, couplers, adhesives, magnetic elements, and the like. In some embodiments, the first inner member 22, second inner member 24, and first brace 26 may be integrally formed of a unitary structure.

In the embodiment shown in the figures, it can be seen that the first inner member 22 extends from the first brace 26 at a right angle and the second inner member 24 extends from the first brace 26 at a right angle. Other angles may be utilized in certain embodiments. The spacing between the first and second inner members 22, 24 may also vary in different embodiments, and thus should not be construed as limited by the exemplary figures.

In the exemplary embodiment shown in FIGS. 1-8, it can be seen that the first inner member 22 extends from or is connected to the first brace 26 at a point which is near to or slightly offset from the first end of the first brace 26. The second inner member 24 is similarly shown as extending from or being connected to the first brace 26 at a point which is near to or slightly offset from the second end of the first brace 26.

In some embodiments, the first inner member 22 may be connected to the first end of the first brace 26 and the second inner member 24 may be connected to the second end of the first brace 26. In other embodiments, the first and second inner members 22, 24 may each be positioned closer to each other than is shown in the exemplary embodiments of the figures. In certain embodiments, the first and second inner members 22, 24 could be positioned at or near the center of the length of the first brace 26.

The first brace 26 may be adapted to rest and be secured against either the load 14 or a container wall 12a, 12b of the container 11, depending on the orientation of the load securing device 10. The first brace 26 may thus be comprised of a malleable material such as rubber, plastics, polymers, or the like so as to limit damage to the load 14 or container walls 12a, 12b. In other embodiments, the first brace 26 may be comprised of a more rigid material such as metals or metal alloys. In such embodiments, a sheath or sleeve or softer, more malleable material may be secured at least partially around the first brace 26. In other embodiments, a sheet or other type of softer material may be positioned between the first brace 26 and the container wall 12a, 12b or load 14.

As best shown in FIGS. 1-8, the outer support 30 may comprise a first outer member 32 and a second outer member 34, with the first outer member 32 and the second outer member 34 being parallel with respect to each other. Each of the first and second outer members 32, 34 may comprise various elongated members, such as but not limited to bars, rods, posts, poles, and the like. Although the figures illustrate that the first and second outer members 32, 34 each comprise a square-shaped cross-section, it should be appreciated that various other cross-sections could be utilized, such as but not limited to a circular cross-section or a triangular cross-section.

The first and second outer members 32, 34 are generally adapted to be telescopically adjustable with respect to a pair of corresponding first and second inner members 22, 24 on the inner support 20. Thus, the first and second outer members 32, 34 are generally hollow, with an opening extending at least partially into the length of each outer member 32, 34 In this manner, the inner support 20 may be inserted into the outer support 30 and telescopically adjusted therein.

In the exemplary embodiment shown in the figures, the first and second outer members 32, 34 each comprise elongated members which are hollow for at least a portion of their lengths and which are configured such that corresponding inner members 32, 34 may slide into or out of the outer members 32, 34. Thus, the size of the openings of the outer members 32, 34 will generally be just slightly larger than the size of the corresponding inner members 22, 24 such that the inner members 22, 24 may fit within the outer members 32, 34 as shown in the figures.

The first and second outer members 32, 34 are each shown as being connected to a second brace 36. The manner in which the first and second outer members 32, 34 are connected to the second brace 36 may vary in different embodiments. For example, the first and second outer members 32, 34 may be welded to the second brace 36, or otherwise connected using fasteners, brackets, couplers, adhesives, magnetic elements, and the like. In some embodiments, the first outer member 32, second outer member 34, and the second brace 36 may be integrally formed of a unitary structure.

In the embodiment shown in the figures, it can be seen that the first outer member 32 extends from the second brace 36 at a right angle and the second outer member 34 extends from the second brace 36 at a right angle. Other angles may be utilized in certain embodiments. The spacing between the first and second outer members 32, 34 may also vary in different embodiments, and thus should not be construed as limited by the exemplary figures.

In the exemplary embodiment shown in FIGS. 1-8, it can be seen that the first outer member 32 extends from or is connected to the second brace 36 at a point which is near to or slightly offset from the first end of the second brace 36. The second outer member 34 is similarly shown as extending from or being connected to the second brace 36 at a point which is near to or slightly offset from the second end of the second brace 36.

In some embodiments, the first outer member 32 may be connected to the first end of the second brace 36 and the second outer member 34 may be connected to the second end of the second brace 36. In other embodiments, the first and second outer members 32, 34 may each be positioned closer to each other than is shown in the exemplary embodiments of the figures. In certain embodiments, the first and second outer members 32, 34 could be positioned at or near the center of the length of the second brace 36.

The second brace 36 may be adapted to rest and be secured against either the load 14 or a container wall 12a, 12b of the container 11, depending on the orientation of the load securing device 10. The second brace 36 may thus be comprised of a malleable material such as rubber, plastics, polymers, or the like so as to limit damage to the load 14 or container walls 12a, 12b. In other embodiments, the second brace 36 may be comprised of a more rigid material such as metals or metal alloys. In such embodiments, a sheath or sleeve or softer, more malleable material may be secured at least partially around the second brace 36. In other embodiments, a sheet or other type of softer material may be positioned between the second brace 36 and the container wall 12a, 12b or load 14.

C. Adjustment Members.

As shown throughout the figures, the load securing device 10 may include one or more adjustment members 40, 45 which are utilized in connection with one or more ratchets 60, 65 to adjust the inner and outer supports 20, 30 towards each other or away from each other. Although the figures illustrate the use of two adjustment members 40, 45, it should be appreciated that a single adjustment members 40, 45 may be utilized in some embodiments.

The adjustment members 40, 45 may comprise various configuration, sizes, and shapes. In the exemplary embodiment shown in the figures, each of the adjustment members 40, 45 is illustrated as comprising an elongated member having a plurality of upwardly-extending first teeth 43. In this manner, the first teeth 43 may engage with the first ratchet 60 to allow adjustment of the inner and outer supports 20, 30 towards each other or away from each other to adjust the effective length of the load securing device 10.

Each of the adjustment members 40, 45 may thus comprise various types of elongated members, such as but not limited to bars, rods, posts, poles, and the like. The cross-sectional shape of the adjustment members 40, 45 may comprise various shapes and should not be construed as limited by the exemplary figures. The adjustment members 40, 45 are generally fixedly secured to the respective inner member 22, 24 but not to the outer member 32, 34 such that the adjustment members 40, 45 may slide or otherwise move along the outer members 32, 34 as discussed herein.

In the exemplary embodiment shown in FIGS. 1-8, it can be seen that a first adjustment member 40 is connected between the first inner member 22 of the inner support 20 and the first outer member 32 of the outer support 30. The first adjustment member 40 is illustrated as comprising an elongated member having a first end 41 and a second end 42. The first adjustment member 40 is illustrated as including a plurality of first teeth 43 extending along its upper end. The first teeth 43 may extend along the full length of the first adjustment member 40, or just part of the length of the first adjustment member 40. The length of the first adjustment member 40 may determine the effective range of motion of the load securing device 10.

As shown in the figures, the first adjustment member 40 may function as a track along which the first ratchet 60 is moved in either forward or backwards direction. In this manner, the inner and outer supports 20, 30 may be moved towards each other, with the inner support 20 extending into the outer support 30, or away from each other, with the inner support 20 extending out of the outer support 30.

As best shown in FIGS. 1-8, the first end 41 of the first adjustment member 40 may be connected to the inner support 20. More specifically, the first end 41 of the first adjustment member 40 may be fixedly connected to the first inner member 22 of the inner support 20. However, it should be appreciated that the point of connection between the first inner member 22 of the inner support 20 and the first adjustment member 40 may vary in different embodiments. In some embodiments, the first adjustment member 40 may be connected at a point near its first end 41, or various other locations so long as range of movement of the inner and outer supports 20, 30 is not overly inhibited.

The manner in which the first adjustment member 40 is connected to the inner support 20 may vary. Preferably, the first end 41 of the first adjustment member 40 is fixedly connected to the first inner member 22 of the inner support 20 such that the first end 41 of the first adjustment member 40 moves with the first inner member 22 of the inner support 20.

In the exemplary embodiment shown in the figures, a fastener 44 is illustrated as securing the first end 41 of the first adjustment member 40 to a point on the first inner member 22 of the inner support 20. Such fasteners 44 may include screws, nuts, bolts, nails, and the like. However, it should be appreciated that other methods of connection may be utilized, such as but not limited to the use of adhesives, welding, clamps, brackets, ties, and the like.

Figure 2:
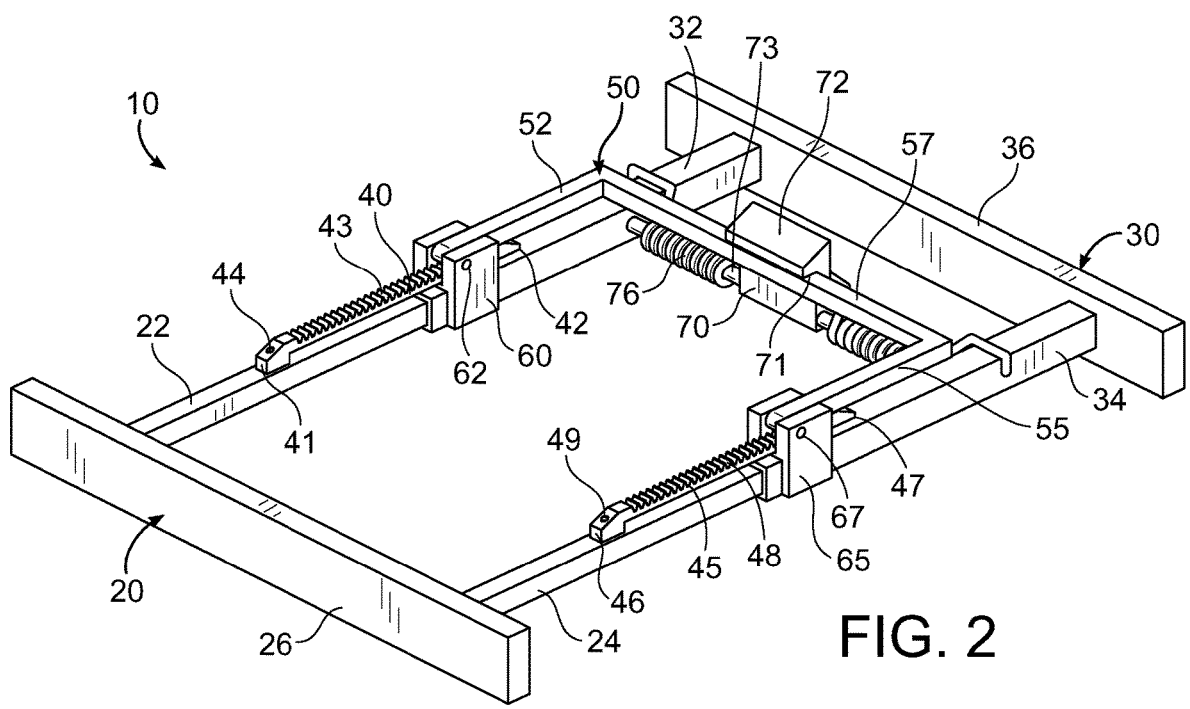
FIG. 2 is a perspective view of a load securing device with the handle engaged in accordance with an example embodiment.

As best shown in FIGS. 1 and 2, the first end 41 of the first adjustment member 40 may include a first stop 38 which is adapted to catch upon the outer edge of the first outer member 32. The first stop 38 prevents the inner support 20 from being inserted into the outer support 30 past a certain point. The first stop 38 may comprise a flange, lip, or other type of projection which is adapted to contact the outer edge of the first outer member 32 so as to stop movement of the first inner member 22 further into the first outer member 32.

Continuing to reference FIGS. 1 and 2, it can be seen that the second end 42 of the first adjustment member 40 is positioned upon the outer support 30. The second end 42 of the first adjustment member 40 is generally movably positioned upon the first outer member 32 such that the second end 42 of the first adjustment member 40 may slide or otherwise move along the length of the first outer member 32. The second end 42 of the first adjustment member 40 may pass through the first ratchet 60 so as to prevent the first adjustment member 40 from falling out of alignment with the first outer member 32 or the first inner member 22.

In the exemplary embodiment shown in FIGS. 1-8, 12, and 13, it can be seen that a second adjustment member 45 is connected between the second inner member 24 of the inner support 20 and the second outer member 34 of the outer support 30. The second adjustment member 45 is illustrated as comprising an elongated member having a first end 41 and a second end 42. The second adjustment member 45 is illustrated as including a plurality of second teeth 48 extending along its upper end. The second teeth 48 may extend along the full length of the second adjustment member 45, or just part of the length of the second adjustment member 45. The length of the second adjustment member 45 may determine the effective range of motion of the load securing device 10.

As shown in the figures, the second adjustment member 45 may function as a track along which the second ratchet 65 is moved in either forward or backwards direction. In this manner, the inner and outer supports 20, 30 may be moved towards each other, with the inner support 20 extending into the outer support 30, or away from each other, with the inner support 20 extending out of the outer support 30.

As best shown in FIGS. 1-8, 12, and 13, the first end 46 of the second adjustment member 45 may be connected to the inner support 20. More specifically, the first end 46 of the second adjustment member 45 may be fixedly connected to the second inner member 24 of the inner support 20. However, it should be appreciated that the point of connection between the second inner member 24 of the inner support 20 and the second adjustment member 45 may vary in different embodiments. In some embodiments, the second adjustment member 45 may be connected at a point near its first end 46, or various other locations so long as range of movement of the inner and outer supports 20, 30 is not overly inhibited.

The manner in which the second adjustment member 45 is connected to the inner support 20 may vary. Preferably, the first end 46 of the second adjustment member 45 is fixedly connected to the second inner member 24 of the inner support 20 such that the first end 46 of the second adjustment member 45 moves with the second inner member 24 of the inner support 20.

In the exemplary embodiment shown in the figures, a fastener 49 is illustrated as securing the first end 46 of the second adjustment member 45 to a point on the second inner member 24 of the inner support 20. Such fasteners 49 may include screws, nuts, bolts, nails, and the like. However, it should be appreciated that other methods of connection may be utilized, such as but not limited to the use of adhesives, welding, clamps, brackets, ties, and the like.

As best shown in FIGS. 1 and 2, the first end 46 of the second adjustment member 45 may include a second stop 39 which is adapted to catch upon the outer edge of the second outer member 34. The second stop 39 prevents the inner support 20 from being inserted into the outer support 30 past a certain point. The second stop 39 may comprise a flange, lip, or other type of projection which is adapted to contact the outer edge of the second outer member 34 so as to stop movement of the second inner member 24 further into the second outer member 34.

Continuing to reference FIGS. 1 and 2, it can be seen that the second end 47 of the second adjustment member 45 is positioned upon the outer support 30. The second end 47 of the second adjustment member 45 is generally movably positioned upon the second outer member 34 that the second end 47 of the second adjustment member 45 may slide or otherwise move along the length of the second outer member 34. The second end 47 of the second adjustment member 45 may pass through the second ratchet 65 so as to prevent the second adjustment member 45 from falling out of alignment with the second outer member 34 or the second inner member 32.

D. Handle and Ratchets.

As best shown in FIGS. 1-5, 12, and 13, the load securing device 10 may include a handle 50 which serves a number of functions. The handle 50 may be utilized to drive the ratchets 60, 65 to adjust the inner and outer supports 20, 30 either towards each other to reduce the effective length of the load securing device 10 or away from each other to increase the effective length of the load securing device 10. Additionally, the handle 50 functions to lock the inner and outer supports 20, 30 in position when in used in conjunction with a locking member 70 discussed herein. Further, the handle 50 may be utilized to grasp and move the load securing device 10 between various locations.

The shape, size, structure, and configuration of the handle 50 may vary in different embodiments, and thus should not be construed as limited by the exemplary figures. In the exemplary embodiment shown in FIGS. 1-5, the handle 50 is illustrated as comprised of a substantially U-shaped configuration with hard corners. In other embodiments, the handle 50 could have curved corners or could comprise various other shapes, such as a semi-circular shape.

Figure 12:
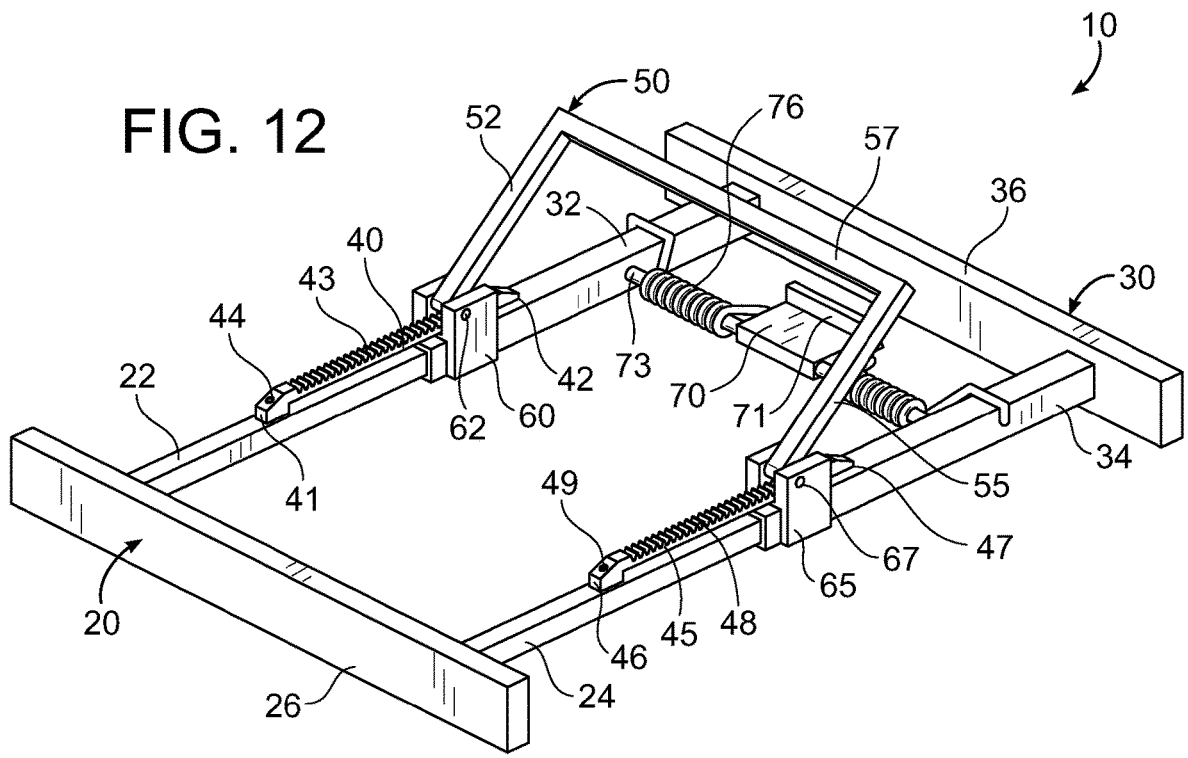
FIG. 12 is a perspective view of a handle in the act of disengaging from the locking member of a load securing device in accordance with an example embodiment.

Continuing to reference FIGS. 1-5, 12, and 13, it can be seen that the handle 50 may comprise a first member 52, a second member 55, and a cross member 57. The first member 52 may comprise an elongated member such as a pole, rod, post, bar, or the like. The first member 52 may include a first end 53 which is connected to the first ratchet 60 as shown in FIG. 12 in such a manner that pivoting of the handle 50 will adjust the first ratchet 60.

Similarly, the second member 54 may comprise an elongated member such as a pole, rod, post, bar, or the like. The second member 54 may include a second end 56 which is connected to the second ratchet 65 in such a manner that pivoting of the handle 50 will adjust the second ratchet 65 in concert with adjustment of the first ratchet 60. The second member 54 may be parallel with respect to the first member 52 as shown in the figures.

It should be appreciated that various types of ratchets 60, 65 known in the art may be utilized with the systems and methods described herein. The figures illustrate a simplified configuration of the ratchets 60, 65 for illustration purposes only. Any type of ratchet 60, 65 known in the art for adjusting an elongated member may be utilized, including but not limited to a US Cargo Control Ratchet for Cargo Load Bar as is known in the art. The ratchets 60, 65 will generally include a gear and a pawl which allows rotation of the gear in a single direction. The pawl may be released as-needed to allow free rotation of the gear in the opposite direction.

The distal ends of the first and second members 52, 55 may be linked by a cross member 57 such that the handle 50 may comprise a U-shaped configuration such as shown in FIGS. 1-5, 12, and 13. In some embodiments such as shown in the figures, the first member 52, second member 55, and cross member 57 may be integrally formed of a unitary structure. In other embodiments, the first, second, and cross members 52, 55, 57 may comprise interconnected structures.

As shown throughout the figures, the load securing device 10 may include one or more ratchets 60, 65 which are used to adjust the effective length of the load securing device 10 by drawing the inner and outer supports 20, 30 towards each other or away from each other. In the exemplary embodiment shown in FIGS. 1-5, a first ratchet 60 is connected to the first outer member 32 and first adjustment member 40 and a second ratchet 65 is connected to the second outer member 34 and second adjustment member 45. In some embodiments, only a single ratchet 60 may be utilized.

The first ratchet 60 is generally connected to the first outer member 32 of the outer support 30. The manner in which the first ratchet 60 is connected to the first outer member 32 may vary. Further, the positioning of the first ratchet 60 may vary. In the exemplary embodiment shown in the figures, the first ratchet 60 is connected to the first outer member 32 near where the first inner member 32 extends into the first outer member 32.

Figure 9:
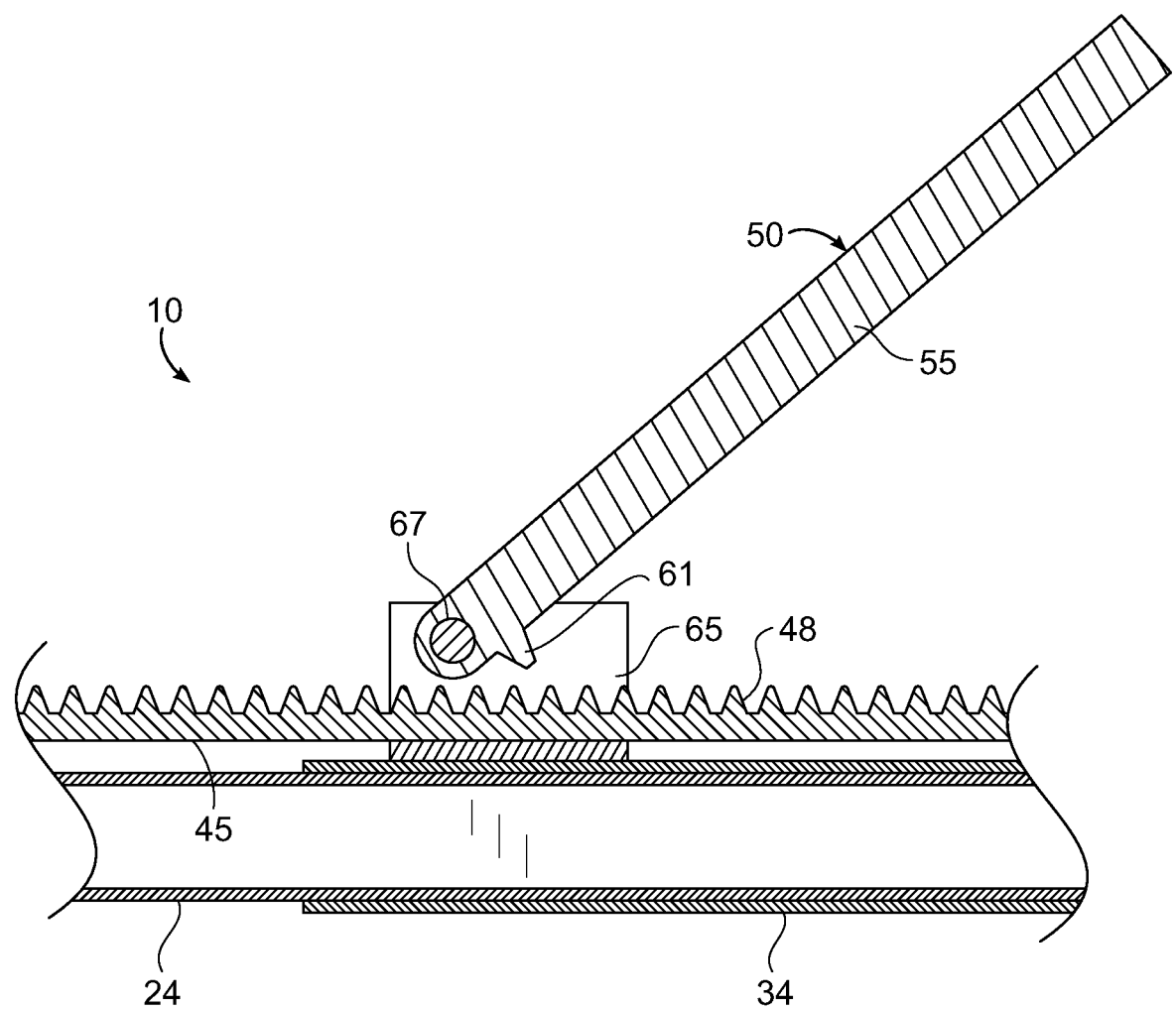
FIG. 9 is a side sectional view of a load securing device focused on the ratchet, supports, and adjustment member in accordance with an example embodiment.
Figure 10A:
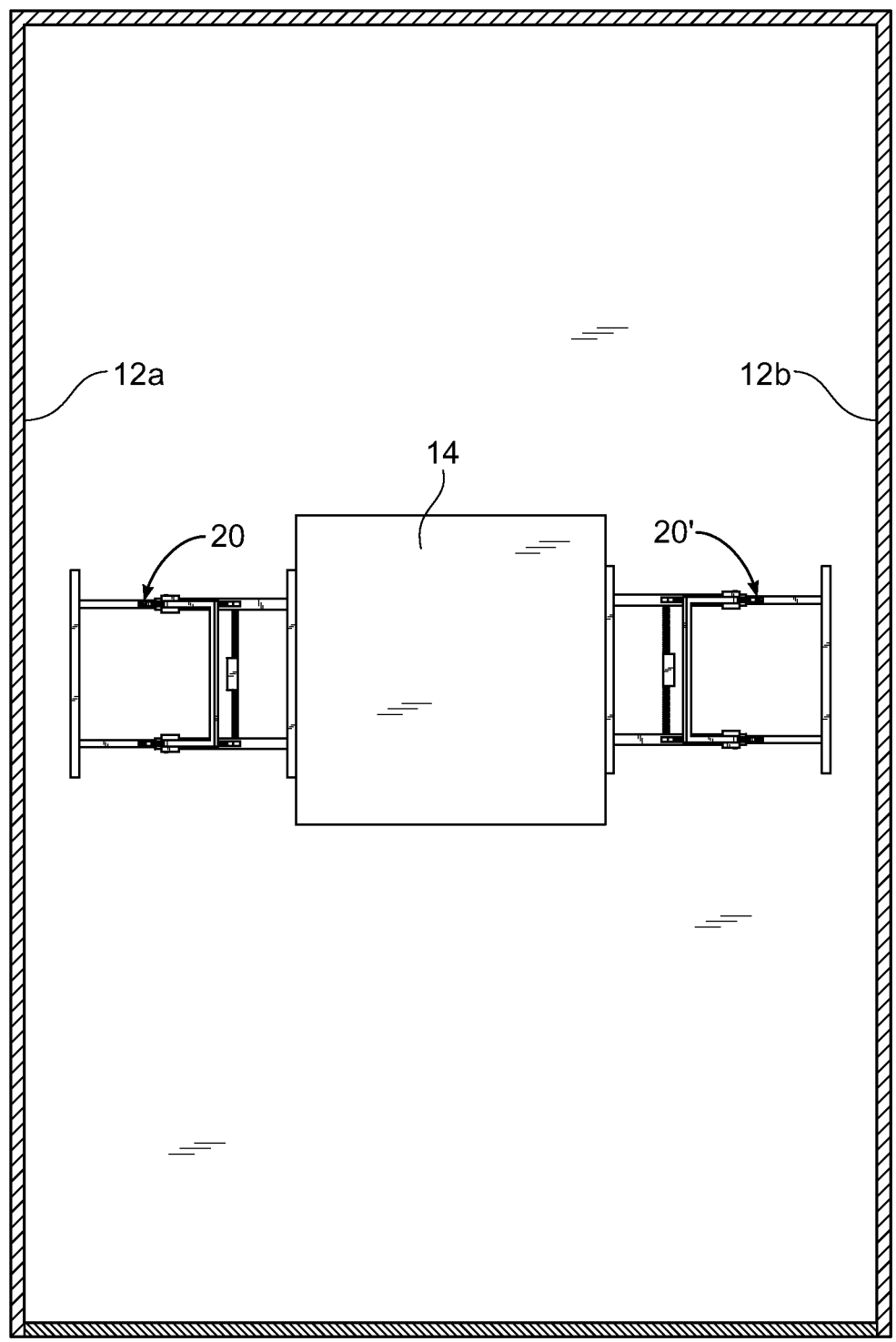
FIG. 10A is a top view of a pair of load securing devices positioned against a load within a container in accordance with an example embodiment.
Figure 10B:
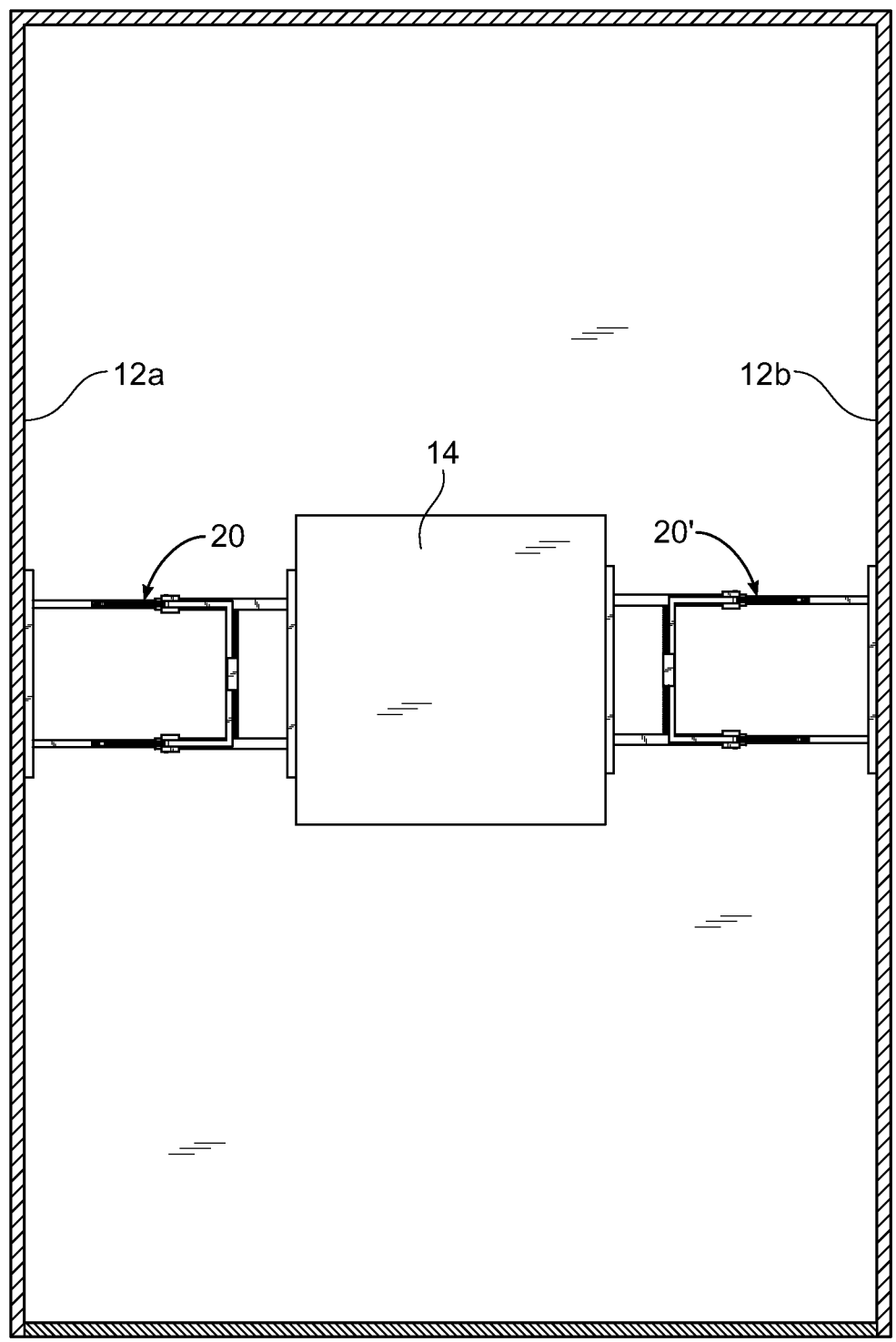
FIG. 10B is a top view of a pair of load securing devices in position to secure a load within a container in accordance with an example embodiment.
Figure 11A:
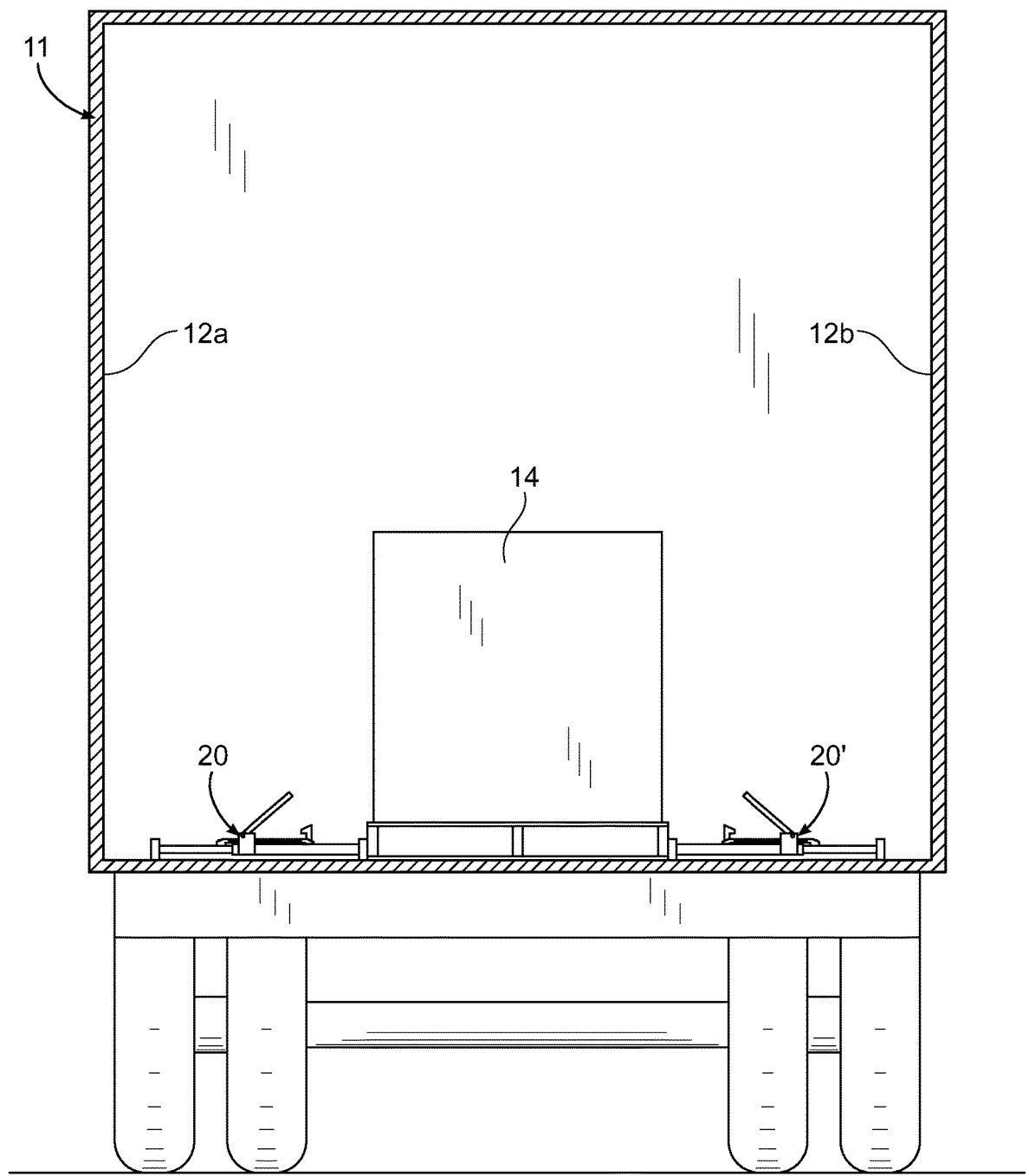
FIG. 11A is a front view of a pair of load securing devices positioned against a load within a container in accordance with an example embodiment.
Figure 11B:
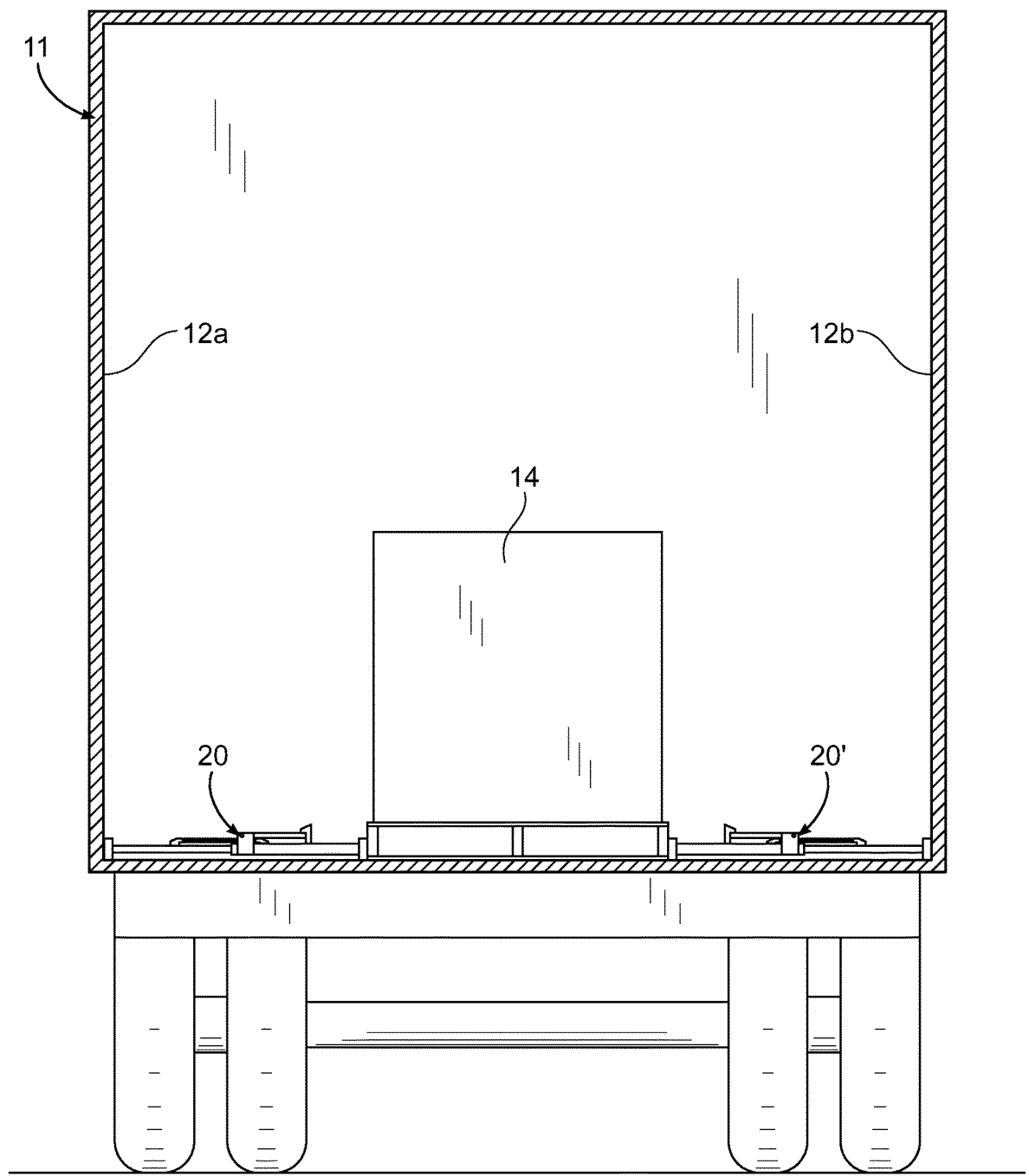
FIG. 11B is a front view of a pair of load securing devices in position to secure a load within a container in accordance with an example embodiment.

The first ratchet 60 is configured to be adjusted by pivoting the handle 50, with the first member 52 being configured to adjust the first ratchet 60 such that the first ratchet 60 draws the first adjustment member 40 when the handle 50 is pivoted in a first direction. The first ratchet 60 may thus include a ratchet tooth 61 as shown in FIG. 9 which engages with the first teeth 43 on the first adjustment member 40 when the handle 50 is pivoted in the first direction. The ratchet tooth 61 may comprise a pawl which is standard with conventional ratchet configurations. In some embodiments, the ratchets 60, 65 may each include a gear having a plurality of ratchet teeth 61 configured to engage with the first or second teeth 43, 48.

As the ratchet tooth 61 engages within the first teeth 43 and the handle 50 is pivoted, the first ratchet 60 will draw the first adjustment member 40 such that the first adjustment member 40 pushes the first inner member 22 outwardly from the first outer member 32, and thus pushes the inner support 20 away from the outer support 30. In this manner, the effective length of the load securing device 10 may be adjusted to suit different situations. The first ratchet 60 may include a releasable lock which disengages the first ratchet 60 so that the first inner member 22 may be pushed back into the first outer member 32.

In some embodiments, a second ratchet 65 may be utilized. In such embodiments, both of the ratchets 60, 65 may be linked together by the handle 50 such that both ratchets 60, 65 are adjusted simultaneously when the handle 50 is pivoted. Thus, in the embodiment best shown in FIGS. 1-5, 12, and 13, it can be seen that the first end 53 of the handle 50 is connected to the first ratchet 50 and that the second end 56 of the handle 50 is connected to the second ratchet 65.

The second ratchet 65 is generally connected to the second outer member 34 of the outer support 30. The manner in which the second ratchet 65 is connected to the second outer member 34 may vary. Further, the positioning of the second ratchet 65 may vary. In the exemplary embodiment shown in the figures, the second ratchet 65 is connected to the second outer member 34 near where the second inner member 24 extends into the second outer member 34.

The second ratchet 65 is configured to be adjusted by pivoting the handle 50, with the second member 55 being configured to adjust the second ratchet 65 such that the second ratchet 65 draws the second adjustment member 45 when the handle 50 is pivoted in a first direction. The second ratchet 65 may thus include a ratchet tooth which engages with the second teeth 47 on the second adjustment member 45 when the handle 50 is pivoted in the first direction. The ratchet tooth of the second ratchet 65 is not shown, but matches the configuration of the first ratchet tooth 61 of the first ratchet 60. The ratchet tooth of the second ratchet 65 may comprise a pawl, or may extend from a rotatable gear.

As the ratchet tooth engages within the second teeth 48 and the handle 50 is pivoted, the second ratchet 65 will draw the second adjustment member 45 such that the second adjustment member 45 pushes the second inner member 24 outwardly from the second outer member 34, and thus pushes the inner support 20 away from the outer support 30. In this manner, the effective length of the load securing device 10 may be adjusted to suit different situations. The second ratchet 65 may include a releasable lock which disengages the second ratchet 65 so that the second inner member 24 may be pushed back into the second outer member 34.

By use of a pair of ratchets 60, 65 working in conjunction, the inner support 20 may be incrementally drawn away from the outer support 30 to lengthen the effective length of the load securing device 10. Releasing the ratchets 60, 65 allows the inner support 20 to be manually pushed back into the outer support 30 to shorten the effective length of the load securing device 10. The handle 50 may be utilized to control both ratchets 60, 65 simultaneously, with the first end 53 of the handle 50 being connected to the first ratchet 60 and the second end 56 of the handle 50 being connected to the second ratchet 65.

E. Locking Member.

As best shown in FIGS. 1-8, the load securing device 10 may include a locking member 70 which functions to lock the handle 50 in a lowered position such that the ratchets 60, 65 may not be further adjusted. In this manner, the inner and outer supports 20, 30 may be locked in position with respect to each other such that pushing or pulling on either of the inner or outer supports 20, 30 will not further adjust the effective length of the load securing device 10. Preferably, the load securing device 10 will be locked when in use securing a load 14 so that the load securing device 10 does not adjust and release the load 14 prematurely.

Figure 5:
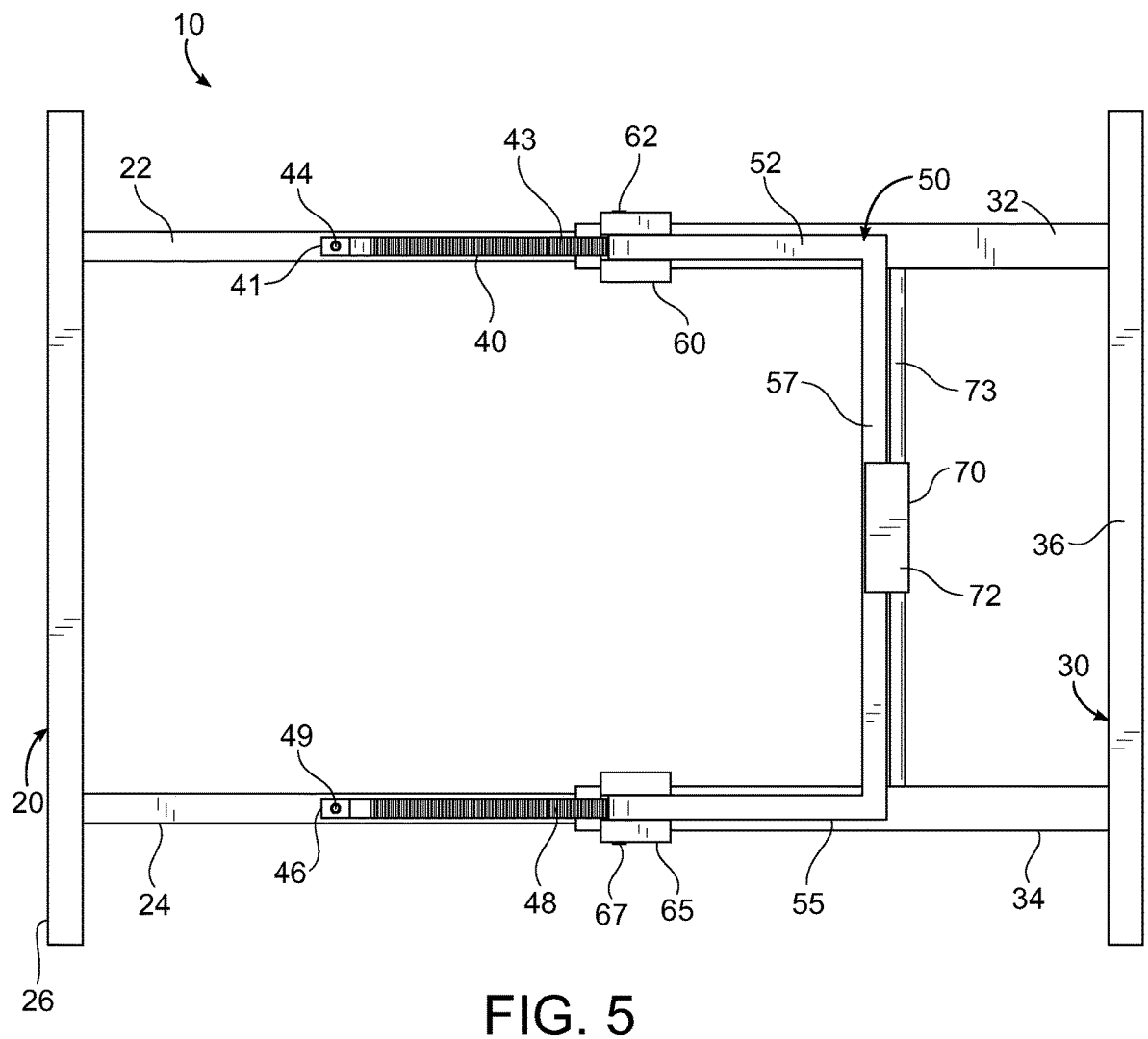
FIG. 5 is a top view of a load securing device with the handle engaged in the locking device in accordance with an example embodiment.
Figure 6:
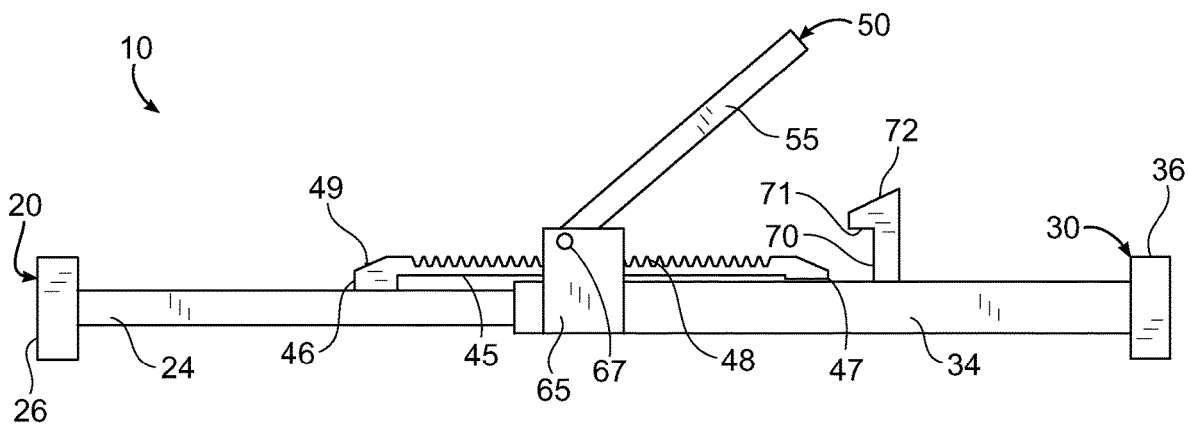
FIG. 6 is a side view of a load securing device with the handle disengaged from the locking device in accordance with an example embodiment.
Figure 7:
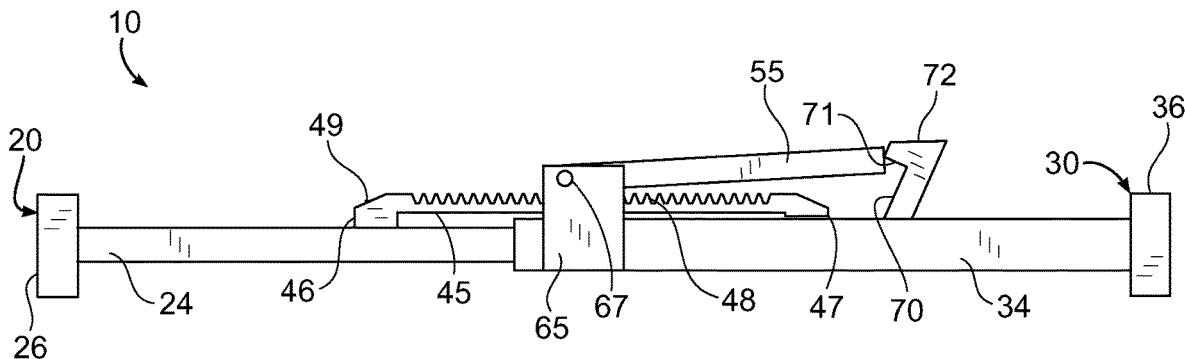
FIG. 7 is a side view of a load securing device with the handle engaging with the locking device in accordance with an example embodiment.
Figure 8:
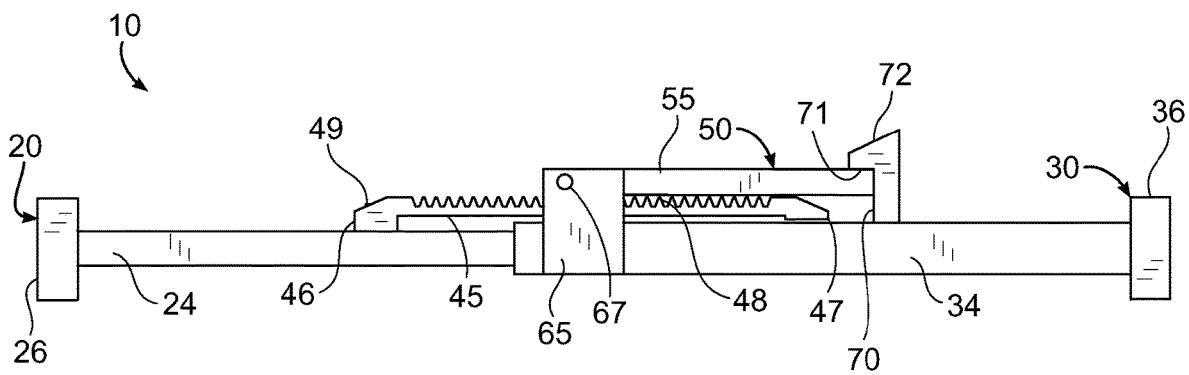
FIG. 8 is a side view of a load securing device with the handle engaged with the locking device in accordance with an example embodiment.

The locking member 70 may comprise a block or other structure which includes a flange 71 adapted to catch on the handle 50 to selectively and removably lock the handle 50 in a lowered position over the outer support 30 such as shown in FIGS. 2, 5, and 8. The shape, size, positioning, and orientation of the locking member 70 may vary in different embodiments. In the exemplary embodiment shown in FIGS. 1, 2, 12, and 13, the locking member 70 comprises a rectangular block having a flange 71 and slanted portion 72 at its upper end. As shown in FIGS. 6-8, the cross member 57 of the handle 50 is configured to pass over the slanted portion 72 of the locking member 70 to fall into and engage against the flange 71 of the locking member 70 to be locked. The locking member 70 may thus be rotatably or pivotably adjustable such that the handle 50 may push the locking member 70 back as the cross member 57 passes over the slanted portion 72 of the locking member 70. After passing over the slanted portion 72 of the locking member 70, the cross member 57 will snap past the flange 71 and be secured underneath the flange 71 such as shown in FIG. 8, which prevents further adjustment of the handle 50 and thus prevents further adjustment of the ratchets 60, 65.

The locking member 70 may be connected to a lock support 73 such as shown in FIGS. 1-5, 12, and 13. The locking support 73 comprises an elongated member such as a post, pole, rod, bar, or the like, which is connected across the outer support 30. More specifically, the locking support 73 may be connected at its first end to the first outer member 32 of the outer support 30 and at its second end to the second outer member 34 of the outer support 30.

The locking member 70 is connected to the lock support 73 such that the locking member 70 may be adjusted back towards the second brace 36 by pivoting or rotation. A spring 76 may be included so as to bias the locking member 70 towards its upright, vertical position. In this manner, the locking member 70 may be pivoted or rotated back towards the second brace 36 when the handle 50 passes over the slanted portion 72 prior to snapping back through bias force applied by the spring 76 into its upright position such that the handle 50 is engaged with the flange 71 and thus locked in a lowered position against the outer support 30 such as shown in FIG. 5.

Thus, absent any force, the locking member 70 is oriented in a vertical orientation, with the locking member 70 only being forced back by the handle 50 when the handle 50 is being adjusted downwardly towards the second brace 36 with sufficient force to bypass the slanted portion 72 and snap into the flange 71.

FIGS. 1-4, 12, and 13 illustrate an exemplary embodiment of a spring 76 being used to bias the locking member 70 towards its upright, vertical position. As shown, a pair of coil springs 76 may be utilized which are connected around the lock support 73, with each spring 76 having a first end attached to the first/second outer member 32, 34 and a second end attached to or secured against the locking member 70. It should be appreciated that various other types of springs 76 may be utilized in different embodiments. For example, the springs 76 could be internal to the locking member 70 in some embodiments. Further, although the figures illustrate a pair of springs 76 being utilized, more or less springs 76 could be utilized as needed so as to impart the bias force against the locking member 70.

To release the locking member 70, one need only force the locking member 70 back towards the second brace 36 so as to release the handle 50 from the flange 71. An operator could grasp the locking member 70 with a hand and force the locking member 70 back. Alternatively and more preferably, an operator could use a foot to push the locking member 70 back sufficiently to disengage the flange 71 from the cross member 57 of the handle 50 and thus release the handle 50. After the handle 50 is released, the locking member 70 will be forced back into its original, vertical position by the spring 76.

F. Operation of Preferred Embodiment.

In use, the load securing device 10 may be utilized to secure a load 14 within a container 11 which includes container walls 12a, 12b that are wider than the load 14 itself. The load securing device 10 may be utilized in a number of manners. In one example, the load 14 could be pushed against the first container wall 12a, with the load securing device 10 being positioned between the second container wall 12b and the load 14 to secure the load 14 in place. In another example, the reverse could occur, with the load 14 being pushed against the second container wall 12b and the load securing device 10 being positioned between the first container wall 12a and the load 14. In other embodiments, two loads 14 could be secured by placing the first load 14 against the first container wall 12a and the second load 14 against the second container wall 12b, with the load securing device 10 being positioned and secured between the two loads 14.

In further embodiments such as shown in FIGS. 10A, 10B, 11A, and 11B, a pair of load securing devices 10, 10' may be utilized. In such embodiments, the load 14 may be positioned at or near the center of the container 11. The first load securing device 10 may be positioned between the first container wall 12a and the load 14, and the second load securing device 10' may be positioned between the second container wall 12b and the load 14. Although the figures illustrate that the load 14 in such an embodiment is centrally-located between the container walls 12a, 12b, it should be appreciated that the load 14 could be closer to either of the container walls 12a, 12b. In such embodiments, the first load securing device 10 may be longer or shorter than the second load securing device 10' when in use.

The load securing device 10 may be secured against the load 14 when resting on the floor of the container 11 such as shown in the figures. In other embodiments, the load securing device 10 may "float", and thus be secured in a raised position above the floor of the container 11. In some embodiments, multiple load securing devices 10, some floating and some on the floor, may be utilized on a single side of the load 14 to provide better support along the height of the load 14.

It should be appreciated that a wide range of loads 14 may be secured using the methods and systems described herein. The figures illustrate that the load 14 comprises a container stored on a pallet, with the pallet being secured by the load securing device 10. It should be appreciated that this is merely for exemplary purposes, and should not be construed as limiting in scope. The load 14 could comprise anything that needs to be transported in a container 11 and has a surface against which the load securing device 10 may be secured. Thus, the load 14 should not be limited in any manner to the pallets and the like shown in the exemplary embodiments of the figures.

It should also be appreciated that a wide range of containers 11 may be utilized with the systems and methods described herein. The figures illustrate a cargo container 11 in a transport truck. Various other types of containers 11 could be utilized so long as the container 11 includes a space to hold a load 14 and a pair of container walls 12a, 12b against which the load securing device 10 may be secured. A wide range of vehicles may transport the container, including but not limited to automobiles, trains, boats, airplanes, and the like.

Figure 3:
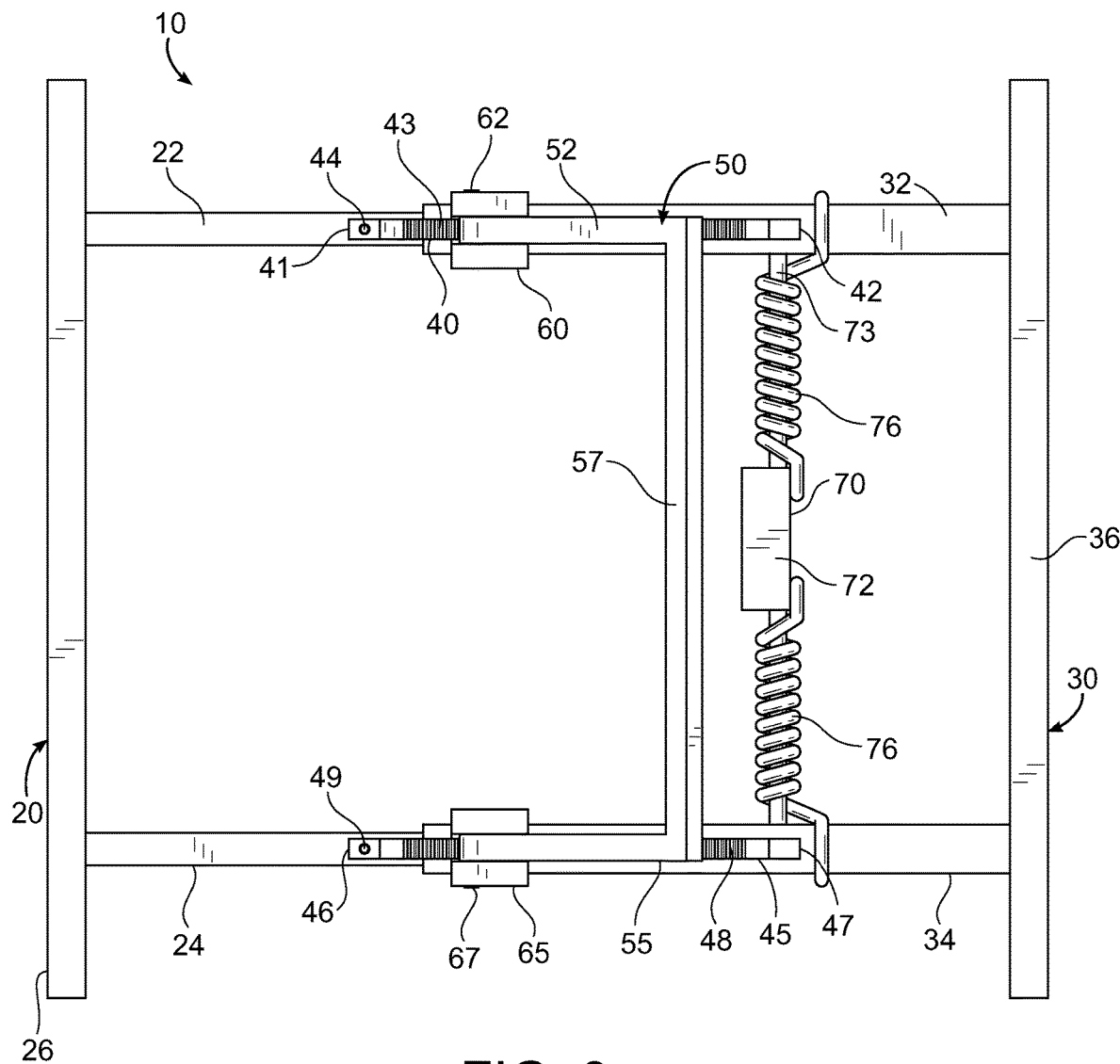
FIG. 3 is a top view of a load securing device with the handle in a forward position in accordance with an example embodiment.
Figure 4:
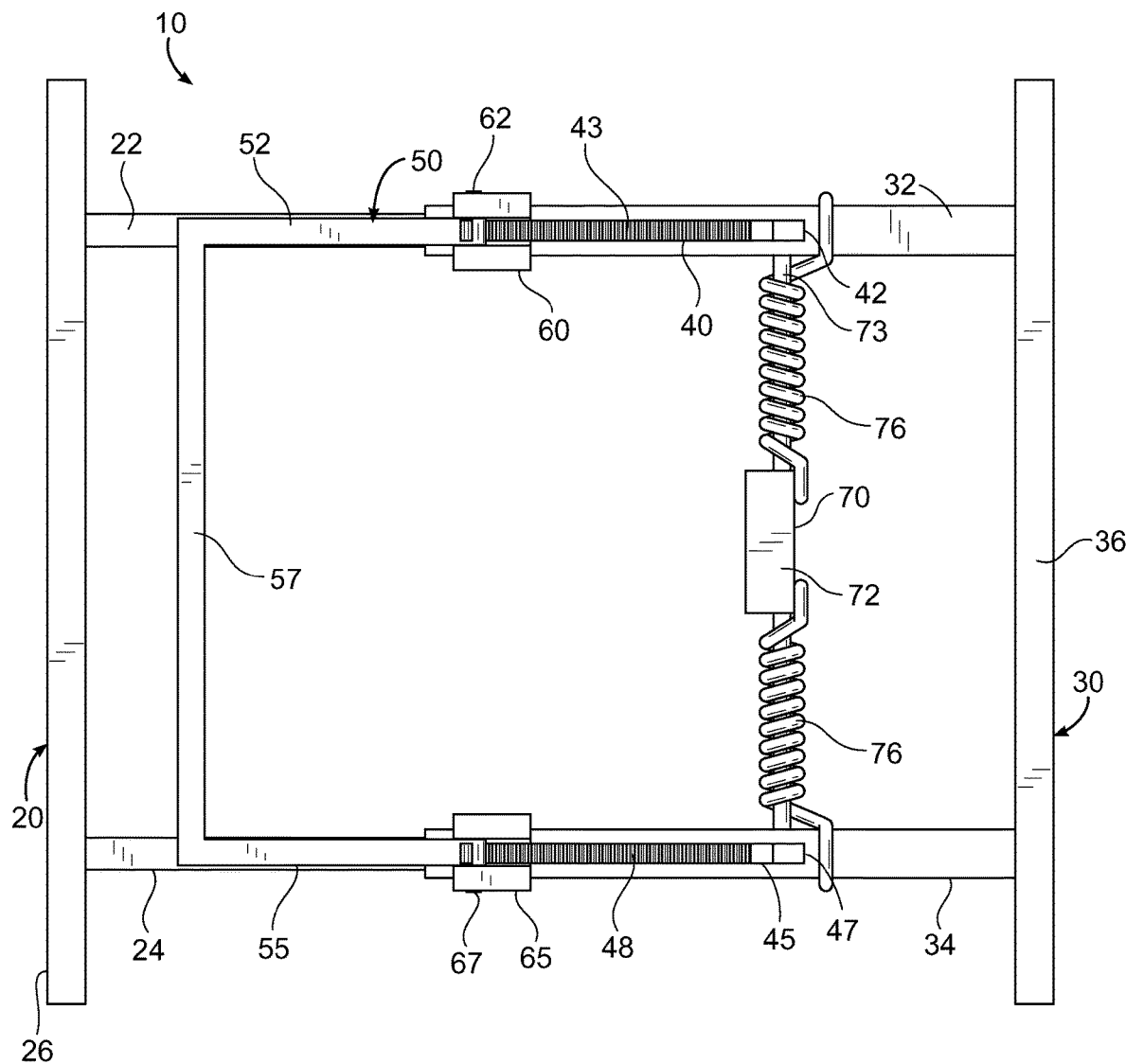
FIG. 4 is a top view of a load securing device with the handle is a rearward position in accordance with an example embodiment.

The pallet locking device 10 may be adjusted in effective length to ensure that the braces 26, 36 are firmly pressed against the container 11 or load 14. FIGS. 3-5 illustrate an exemplary method of elongating the pallet locking device 10. By cranking the handle 50, the ratchets 60, 65 will be activated to drive the inner support 20 out of and away from the outer support 30, thus enlarging the distance between the braces 26, 36. To reduce the effective length of the pallet locking device 10, the ratchets 60, 65 may be released so as to allow the inner support 20 to be manually pulled partially out of the outer support 30, such as by grasping and pulling on the first brace 26.

When the inner and outer supports 20, 30 are each in the desired position with respect to each other, the pallet locking device 10 may be locked into place as shown in FIGS. 6-8. The handle 50 is pushed down so as to traverse the slanted portion 72 of the locking member 70 as shown in FIG. 7. After traversing down the slanted portion 72, the locking member 70 snaps into and engages underneath the flange 71 such as shown in FIG. 8.

Figure 13:
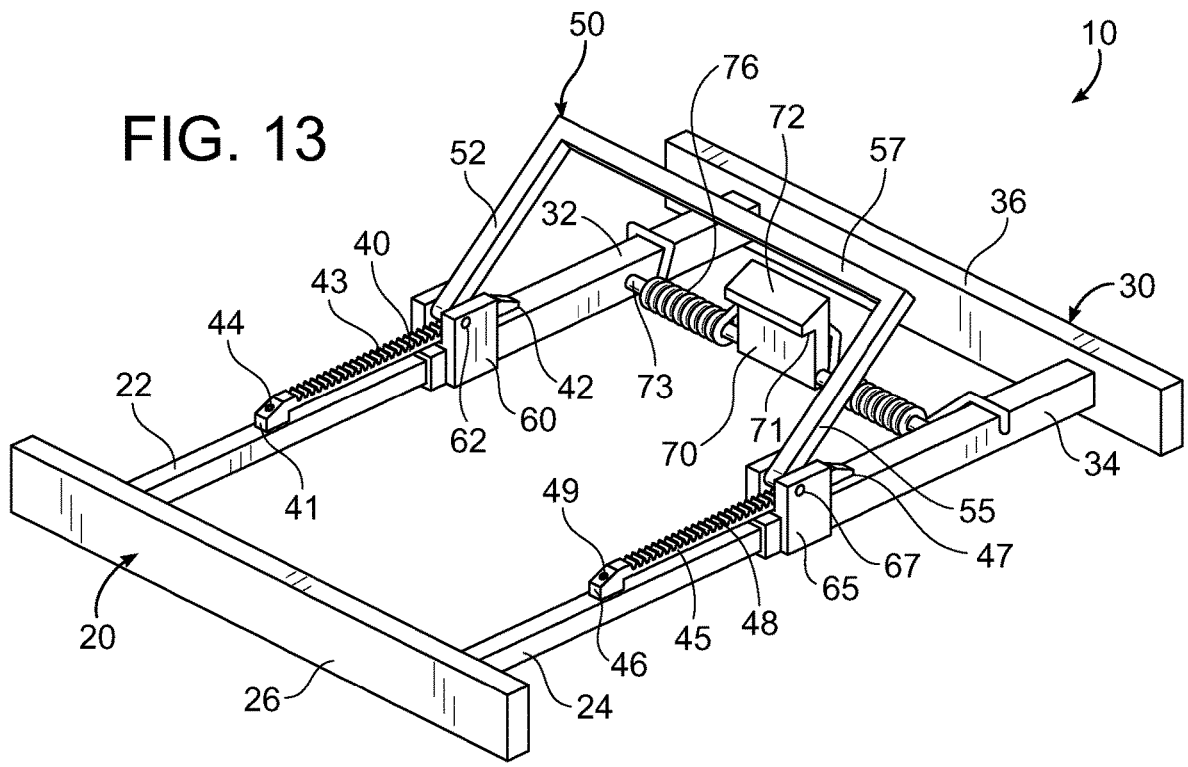
FIG. 13 is a perspective view of a handle disengaged from the locking member of a load securing device in accordance with an example embodiment.

To release the handle 50, the locking member 70 may be pushed backwards and down, such as by hand or use of the foot. FIG. 12 illustrates the locking member 70 being pushed backwards and downwards to disengage from the handle 50. As shown in FIG. 13, the locking member 70 will be returned to its original, upright position upon being released through action of the spring 76, which biases the locking member 70 into its released, upright position.

In use, the load 14 is first positioned in the container 11 and put into the desired position and orientation for transport. With the load 14 in position, the load securing device(s) 10 may be installed. In the embodiment shown in FIGS. 11A and 11B, it can be seen that a load 14 comprised of a pallet and box is positioned centrally between the two container walls 12a, 12b of a container 11. A first load securing device 10 may be placed between the first container wall 12a and the load 14 and a second load securing device 10' may be placed between the second container wall 12b and the load 14.

Each of the load securing devices 10, 10' shown in FIGS. 12A and 12B are installed in the same manner. The load securing device 10 is first placed on the floor of the container 11 between the load 14 and the container wall 12a, 12b, or another anchoring surface such as another load 14. The load securing device 10 is then adjusted so as to extend the effective length of the load securing device 10 such that the load securing device 10 engages against both the container wall 12a, 12b and the load 14, or between the load 14 and another anchoring surface.

To extend the load securing device 10, the handle 50 is repeatedly pivoted in the first direction which engages the ratchets 60, 65. The ratchets 60, 65 engage with and advance the adjustment members 40, 45 such that the inner and outer supports 20, 30 are drawn away from each other, thus increasing the effective length of the load securing device 10. This step is repeated until the first brace 26 is firmly secured against the container wall 12a, 12b and the second brace 36 is firmly secured against the load 14. It should be appreciated that the load securing device 10 is reversible. In some embodiments, the first brace 26 may be secured against the load 14 and the second brace 36 may be secured against the container wall 12a, 12b. In other embodiments, both of the braces 26, 36 may be secured against loads 14.

Once the inner and outer supports 20, 30 have been extended so as to firmly secure the braces 26, 36 against the loads 14 and/or container walls 12a, 12b, the load securing device 10 is locked into position. The handle 50 is lowered towards the second brace 36, with the cross member 57 of the handle 50 passing over the slanted portion 72 of the locking member 70 before catching against the flange 71. The spring 76 allows the locking member 70 to pivot backwards to accommodate the handle 50 passing over the slanted portion 72 of the locking member 70. In this manner, the load securing device 10 is secured such that the load 14 is secured in place and will not move during transport.

When desired, the handle 50 may be released from the locking member 70 to allow the load securing device 10 to be retracted and disengaged from between the load 14 and the container 11. An operator may place his/her foot against the locking member 70 and draw the locking member 70 back towards the second brace 36. This moves the flange 71 off of the cross member 57 of the handle 50 such that the handle 50 may be removed from the locking member 70.

The ratchets 60, 65 may be released so that the inner and outer supports 20, 30 can be freely drawn towards each other. Thus, the inner and outer supports 20, 30 may be adjusted towards each other by, for example, the inner support 20 being pushed towards from the outer support 30. Conversely, the inner and outer supports 20, 30 may be adjusted away from each other by, for example, the inner support 20 being pulled away from the outer support 30. In this manner, the effective length of the load securing device 10 is shortened so that the load securing device 10 may be removed from between the container 11 and the load 14.

After releasing the load securing device 10, it may be moved for further use or storage. The handle 50 may be pulled upwardly and grasped by the operator to lift the load securing device 10 and carry it to another location for further use or for storage purposes.

Unless otherwise defined, all technical and scientific terms used herein have the same meaning as commonly understood by one of ordinary skill in the art to which this invention belongs. Although methods and materials similar to or equivalent to those described herein can be used in the practice or testing of the load securing device, suitable methods and materials are described above. All publications, patent applications, patents, and other references mentioned herein are incorporated by reference in their entirety to the extent allowed by applicable law and regulations. The load securing device may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A load securing device, comprising:
an inner support comprising a first inner member, a second inner member, and a first brace connected between the first inner member and the second inner member;
an outer support comprising a first outer member, a second outer member, and a second brace connected between the first outer member and the second outer member, wherein the inner support is movably connected to the outer support such that the inner support and the outer support may be moved towards or away from each other;
a first adjustment member connected between the inner support and the outer support, the first adjustment member being fixedly connected to the first inner member and movably positioned upon the first outer member;

a first ratchet connected to the first outer member above the first adjustment member;

a handle pivotally connected to the first ratchet such that pivoting the handle adjusts the first ratchet, wherein the first ratchet is operable to push the first inner member away from the first outer member; and a second adjustment member connected between the inner support and the outer support, the second adjustment member being fixedly connected to the second inner member and movably positioned upon the second outer member.

2. The load securing device of claim 1, wherein the first inner member is telescopically connected to the first outer member.

3. The load securing device of claim 1, further comprising a second ratchet connected to the second outer member above the second adjustment member.

4. The load securing device of claim 3, wherein the handle is pivotally connected to the second ratchet such that pivoting the handle adjusts the second ratchet, wherein the second ratchet is operable to push the second inner member out of the second outer member.

5. The load securing device of claim 1, wherein the first inner member is parallel to the second inner member and the first outer member is parallel to the second outer member.

6. The load securing device of claim 1, further comprising a locking member connected to the outer support, wherein the locking member comprises a flange.

7. The load securing device of claim 6, wherein the handle is adapted to releasably engage with the flange of the locking member so as to removably lock the outer support and the inner support in a position.

8. The load securing device of claim 7, wherein the locking member is connected to a lock support, wherein the lock support is connected between the first outer member and the second outer member.

9. The load securing device of claim 8, further comprising a spring connected between the locking member and the lock support so as to bias the locking member towards an upright position.

10. A load securing device, comprising:

an inner support comprising a first inner member, a second inner member, and a first brace connected between the first inner member and the second inner member;

an outer support comprising a first outer member, a second outer member, and a second brace connected between the first outer member and the second outer member, wherein the inner support is movably connected to the outer support such that the inner support and the outer support may be moved towards or away from each other;

a first adjustment member connected between the inner support and the outer support, the first adjustment member being fixedly connected to the first inner member and movably positioned upon the first outer member;

a second adjustment member connected between the inner support and the outer support, the second adjustment member being fixedly connected to the second inner member and movably positioned upon the second outer member; and a first ratchet connected to the first outer member above the first adjustment member;

a second ratchet connected to the second outer member above the second adjustment member; and a handle pivotally connected to the first ratchet and the second ratchet such that pivoting the handle adjusts the first ratchet and the second ratchet, wherein the first ratchet is operable to push the first inner member out of the first outer member, wherein the second ratchet is operable to push the second inner member out of the second outer member.

11. A load securing device, comprising:

an inner support comprising a first inner member, a second inner member, and a first brace connected between the first inner member and the second inner member;

an outer support comprising a first outer member, a second outer member, and a second brace connected between the first outer member and the second outer member, wherein the inner support is movably connected to the outer support such that the inner support and the outer support may be moved towards or away from each other;

a first adjustment member connected between the inner support and the outer support, the first adjustment member being fixedly connected to the first inner member and movably positioned upon the first outer member;

a first ratchet connected to the first outer member above the first adjustment member;

a handle pivotally connected to the first ratchet such that pivoting the handle adjusts the first ratchet, wherein the first ratchet is operable to push the first inner member away from the first outer member; and a locking member connected to the outer support, wherein the locking member comprises a flange, and wherein the handle is adapted to releasably engage with the flange of the locking member so as to removably lock the outer support and the inner support in a position.

12. The load securing device of claim 11, wherein the first inner member is telescopically connected to the first outer member.

13. The load securing device of claim 11, further comprising a second ratchet connected to the second outer member above a second adjustment member.

14. The load securing device of claim 13, wherein the handle is pivotally connected to the second ratchet such that pivoting the handle adjusts the second ratchet, wherein the second ratchet is operable to push the second inner member out of the second outer member.

15. The load securing device of claim 11, wherein the first inner member is parallel to the second inner member and the first outer member is parallel to the second outer member.

16. The load securing device of claim 11, wherein the locking member is connected to a lock support, wherein the lock support is connected between the first outer member and the second outer member.

17. The load securing device of claim 16, further comprising a spring connected between the locking member and the lock support so as to bias the locking member towards an upright position.

* * * * *